May 24, 1966   H. J. GRIEB   3,252,282
GAS TURBINE
Filed July 19, 1963
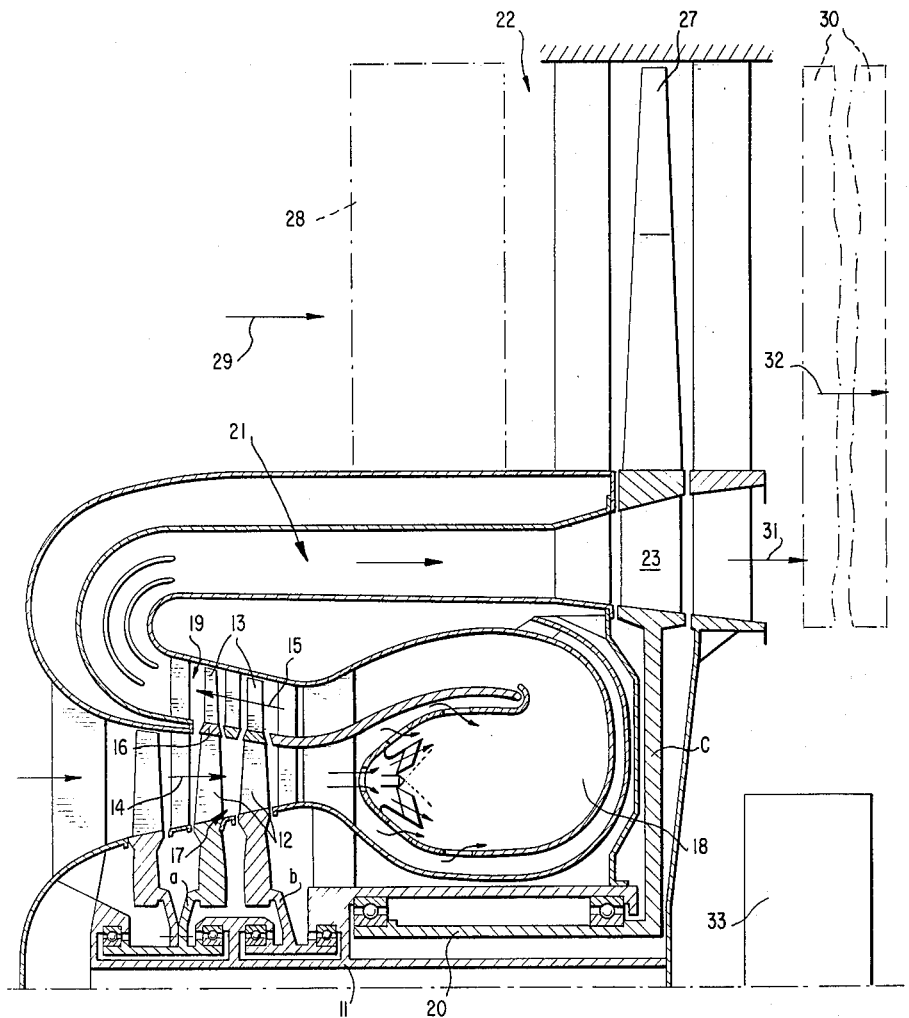
INVENTOR.
HUBERT J. GRIEB
BY Dicke + Craig
ATTORNEYS 3,252,282
GAS TURBINE
Hubert J. Grieb, Stuttgart-Botnang, Germany, assignor to Daimler-Benz Aktiengesellschaft, Stuttgart-Unterturkheim, Germany
Filed July 19, 1963, Ser. No. 296,300
Claims priority, application Germany, July 27, 1962, D 39,470
3 Claims. (Cl. 60—35.6)

The present invention relates to a two-stage gas turbine jet propulsion unit with mutually independently supported rotors which carry radially inwardly preferably transsonically or supersonically designed air compressor blades and radially outwardly thereof gas turbine blades and intermediate these blades coaxial rings closing off the compressed air flow against the oppositely directed gas turbine flow, and which additionally comprises a combustion chamber arranged at the end of the compressor channel which combustion chamber discharges into a turbine channel behind which the propulsion gases are once more deflected by 180° in to the thrust channel of the first stage of the propulsion unit so that the air flowing into the compressor and the thrust gases leaving the propulsion unit have the same direction of flow whereby an additional rotor is provided that carries turbine blades radially inwardly and compressor blades radially outwardly, the latter rotating within the flow channel of the second thrust stage of the propulsion unit.

In gas turbine propulsion units of the aforementioned type, it is known to guide the propulsion gases leaving the turbine channel, within which the compressor drive turbines rotate, through the stationary inlet guide blades of the second stage radially outwardly and then to deflect the same by 180° so that the thrust channel of the first stage is disposed radially outwardly whereas the thrust channel of the second stage of the propulsion unit, namely, the compressor thrust stage, is disposed radially inwardly of the thrust channel of the first stage. The thrust compressor blades are seated thereby in several rows on a rotor which carries radially inwardly rows of turbine blades which also rotate within the turbine channel adjoining the combustion chamber within which are disposed the compressor drive turbines.

In contradistinction to the known types of construction of counter-flow propulsion units, the present invention essentially consists in that the thrust compressor rotor is freely supported at the end of the drive unit behind the combustion chamber, the hub portion thereof being accommodated in the space that is enclosed by the combustion chamber, and in that the turbine blades thereof are provided in the inwardly disposed thrust channel of the first thrust stage with respect to the radially outward compressor thrust stage within which the compressor blades thereof rotate.

According to a further feature of the present invention, it is further proposed to provide within the space disposed in front of the thrust compressor blades adjustable inlet guide blades for the control of the inflowing air for the compressor thrust stage and within the space to the rear of the thrust compressor blades adjustable outlet guide blades for the control of the thrust streams of both stages. The free space which is enclosed by the last-mentioned outlet guide blade can be utilized for the arrangement of auxiliary aggregates or units.

The present invention, while maintaining a short type of construction, affords a considerable constructive simplification of the thrust compressor rotor which, in the known prior art types of construction of counter-flow propulsion units, extends through the air compressor channel and turbine channel and, aside from the centrifugal force effect, is thereby exposed to additional heat stresses and loads. Moreover, the proposed manner of construction permits large by-pass conditions because the ratio between the inner diameter of the turbine of the compressor thrust rotor and the outer diameter of the compressor thrust channel is relatively large. The aerodynamic load of the turbine is thereby kept relatively small.

The concept of the propulsion unit proposed in accordance with the present invention is suitable above all for the installation in airplanes as lift propulsion unit.

Accordingly, it is an object of the present invention to provide a two-stage gas turbine jet propulsion unit of the type mentioned hereinabove which permits a relatively short and compact construction in addition to considerable simplification of the thrust compressor rotor.

Another object of the present invention resides in the provision of a two-stage gas turbine jet propulsion unit in which thermal loads are minimized.

A still further object of the present invention resides in the provision of a two-stage gas turbine jet propulsion unit that assures relatively large by-pass conditions while maintaining relatively small the aerodynamic loads on the turbine.

These and other objects, features, and advantages of the present invention will become more obvious from the following description when taken in connection with the accompanying drawing which shows in the single figure thereof, for purposes of illustration only, one embodiment in accordance with the present invention.

Referring now to the single feature of the drawing which illustrates in partial longitudinal cross-sectional view through a two-stage gas turbine jet propulsion unit in accordance with the present invention, reference numeral 11 designates therein a shaft fixed within the engine housing. Individual rotors $a$, $b$ are rotatably supported on the shaft 11 independently of one another, which rotors carry radially inwardly thereof air compressor blades 12, radially outwardly thereof turbine blades 13 and intermediate these two sets of blades coaxial rings 16 closing the air compressor flow 14 with respect to the oppositely directed gas turbine flow 15. The combustion chamber 18 is disposed at the end of the air compressor channel 17 whereby the hot combustion or propulsion gases are deflected by about 180° within the or behind the combustion chamber 18 and are permitted to enter into the compressor-turbine channel 19 where they form the gas turbine flow or stream 15 which drives both rotors $a$ and $b$. The propulsion gases are once more deflected by 180° to the rear of the turbine channel 19 and then flow into the thrust channel generally designated by reference numeral 21 from which they are discharged into the atmosphere while producing a thrust from the first thrust stage.

Locally behind the combustion chamber 18 at the end of the propulsion unit is a further rotor, namely, the compressor rotor $c$ which is arranged freely rotatable with bearing support of the hub portion 20 thereof within the space that is enclosed by the combustion chamber 18. Radially outwardly the rotor $c$ carries the compressor blades 27 which rotate within the thrust compressor channel generally designated by reference numeral 22 of the second thrust stage. The rotor $c$ is driven by the turbine blade 23 provided within the thrust channel 21 which are acted upon by the propulsion gases flowing therethrough.

Adjustable inlet guide blades 28 for the control of the air 29 flowing into the thrust channel 22 are provided within the space disposed in front of the compressor blades 27 and adjustable outlet guide blades 30 for the control of both thrust streams 31 and 32 are provided within the space to the rear of the blades 27. Auxiliary aggregates or units 33 are arranged with the free space that is enclosed by the outlet guide blades 30.

While I have shown and described one embodiment in accordance with the present invention, it is understood that the same is not limited thereto but is susceptible of numerous changes and modifications within the spirit and scope thereof as known to a person skilled in the art, and I therefore do not wish to be limited to the details shown and described herein but intend to cover all such changes and modifications are are encompassed by the scope of the appended claims.

I claim:

1. A two-stage gas turbine jet propulsion unit, comprising:
compressor channel means,
turbine channel means,
a plurality of rotor means rotatably supported independently of one another, said rotor means being provided radially inwardly thereof with supersonically designed air compressor blade means, radially outwardly thereof with gas turbine blade means and intermediate said radially inward and radially outward blade means with substantially coaxial annular means closing off the air compressor flow stream against the oppositely directed gas turbine stream,
combustion chamber means arranged at the end of said compressor channel means, said combustion chamber means discharging into said turbine channel means,
thrust channel means for a first stage of said propulsion unit,
connecting means operatively connecting said turbine channel means with said first stage thrust channel means for deflecting the propulsion gases by 180° so that the compressor air stream and the thrust channel stream are directed substantially in the same direction,
and further rotor means carrying radially inwardly thereof turbine blade means and radially outwardly thereof compressor blade means,
flow channel means for a second thrust stage of said propulsion unit,
the compressor blade means of said further rotor means rotating within the second stage flow channel means,
said further rotor means being supported freely rotatably at the end of the propulsion unit to the rear of said combustion chamber means including bearing means for the hub portion of said further rotor means arranged within the space that is enclosed by said combustion chamber means,
and the turbine blade means of said further rotor means being arranged within the inwardly disposed thrust channel means of the first thrust stage with respect to the radially outwardly disposed compressor thrust channel means.

2. A two-stage gas turbine propulsion unit as defined in claim 1, further including adjustable inlet guide blade means for the control of the inflowing air for the compressor thrust stage arranged within the space disposed in front of the thrust compressor blade means, and adjustable outlet guide blade means for the control of the thrust streams of both said first and second thrust stages arranged within the space disposed to the rear of said thrust compressor blade means.

3. A two-stage gas turbine propulsion unit as defined in claim 2, further including auxiliary aggregates of the propulsion unit arranged within the space that is enclosed by the adjustable outlet guide blade means.

No references cited.

MARK NEWMAN, *Primary Examiner.*